US006780509B2

(12) United States Patent
Reiss et al.

(10) Patent No.: US 6,780,509 B2
(45) Date of Patent: Aug. 24, 2004

(54) PROTECTIVE COATING FOR METALLIC COMPONENTS, METALLIC COMPONENT HAVING THE COATING AND METHOD OF FORMING THE COATING

(75) Inventors: Harald Reiss, Heidelberg (DE); Francisco Blangetti, Baden (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/306,435

(22) Filed: Nov. 27, 2002

(65) Prior Publication Data

US 2003/0118843 A1 Jun. 26, 2003

Related U.S. Application Data

(63) Continuation of application No. PCT/EP01/03990, filed on Apr. 6, 2001.

(30) Foreign Application Priority Data

May 27, 2000 (DE) ........................................ 100 26 477

(51) Int. Cl.[7] ............................. B32B 7/02; B32B 9/00

(52) U.S. Cl. ....................... 428/408; 428/469; 428/472; 428/409; 428/212; 416/241 B

(58) Field of Search ................................ 428/457, 408, 428/217, 212, 332, 336, 469–472, 472.1–472.3, 409, 121; 416/241 B

(56) References Cited

U.S. PATENT DOCUMENTS 3,899,366 A 8/1975 Tajkowski
4,991,822 A 2/1991 Enke
5,593,794 A 1/1997 Wei et al.
5,707,717 A * 1/1998 Shibahara et al. .......... 428/217
5,728,465 A * 3/1998 Dorfman et al. ............ 428/408
6,110,329 A * 8/2000 Holleck et al. ........ 204/192.15
6,228,471 B1 * 5/2001 Neerinck et al. ........... 428/216
6,410,144 B2 * 6/2002 Dearnaley et al. .......... 428/408
2002/0028289 A1 * 3/2002 Veerasamy ............... 427/249.7

FOREIGN PATENT DOCUMENTS

| | | | |
|---|---|---|---|
| DE | 37 02 242 | A1 | 9/1987 |
| DE | 39 05 461 | A1 | 9/1989 |
| DE | 38 21 614 | A1 | 12/1989 |
| DE | 196 44 692 | A1 | 4/1998 |
| DE | 197 45 621 | C1 | 11/1998 |
| EP | 0 179 582 | A2 | 4/1986 |
| EP | 0 584 707 | A2 | 3/1994 |
| EP | 0 625 588 | A1 | 11/1994 |
| EP | 0 651 069 | A1 | 5/1995 |
| JP | 59142157 | A | 8/1984 |
| JP | 62178975 | A | 8/1987 |
| JP | 01230777 | A | 9/1989 |
| JP | 04171615 | A | 6/1992 |
| JP | 04236779 | A | 8/1992 |
| JP | 08337874 | A | 12/1996 |
| WO | 96/41901 | | 12/1996 |

* cited by examiner

*Primary Examiner*—Deborah Jones
*Assistant Examiner*—G. Blackwell-Rudasill
(74) *Attorney, Agent, or Firm*—Russell W. Warnock

(57) ABSTRACT

A protective coating is provided for metallic components of power installations which are in direct contact with the water used as a working medium in steam power stations, in particular. The vaporous working medium not only forms an undesirable film of condensate but also contributes to the destruction of the components, due to the impact of drops. The protective coating eliminates these disadvantages. The protective coating has an inhomogeneous structure including at least two layers which are produced from an amorphous material. The layers have different properties which render the components unwettable and resistant to erosion.

11 Claims, 2 Drawing Sheets

PROTECTIVE COATING FOR METALLIC COMPONENTS, METALLIC COMPONENT HAVING THE COATING AND METHOD OF FORMING THE COATING

CROSS-REFERENCE TO RELATED APPLICATION

This application is a continuation of copending International Application No. PCT/EP01/03990, filed Apr. 6, 2001, which designated the United States and was not published in English.

BACKGROUND OF THE INVENTION

FIELD OF THE INVENTION

The invention relates to a protective coating for metallic components which are in direct contact with the condensate of a liquid medium. Protective coatings of this type are provided in particular for components of power plants which are in direct contact with the water used as working medium in particular in steam power plants. The working medium, which is in the form of steam, partially condenses on the components, and/or the working medium which is condensed elsewhere strikes the surfaces of these components in the form of drops with a velocity which is by no means insignificant. There, not only is an undesirable film of condensate formed, but also drop impact makes a contribution to destruction of the component.

Drop condensation on the transfer surfaces of condensers is a phenomenon which has been known for more than 50 years. Due to the extraordinarily high transfer which can be achieved thereby, drop condensation is highly desirable in technical installations used for heat transfer. Nevertheless, it has heretofore scarcely been implemented on an industrial scale. Only applications in which mercury is used to achieve drop condensation are known. In the field of steam condensation, particular efforts have been made to form drop condensation, due to the great importance of the water used therein in energy and mass conversion processes. However, heretofore it has only been possible to maintain drop concentration for a few months with the aid of additives. Heretofore, there has been no disclosure of drop condensation with long-term stability in power plant engineering. However, it is known that drop condensation can be achieved if the surfaces which are acted on by steam are not wetted by the condensate. To achieve this, the surfaces have to have an interfacial energy which is low compared to the surface tension of the condensate. If the condensate is water, the surfaces or layers are referred to as water-repellent or hydrophobic. The contact angle of water on the surfaces of such layers is more than 90 degrees.

Processes for producing hydrophobic surfaces or layers are known from the literature. However, in turbines and power plant condensers they are subject to drop impact erosion. Depending on the moisture content of the steam, the drop size and the drop velocity and also the impact rate, this leads to premature wear to turbine and condenser components. With the specially hardened alloys and tube materials used heretofore and the coatings on turbine or condenser components, it was only possible to reduce the wear with a considerable outlay on materials and high production costs, and it was impossible to eliminate the wear altogether.

It has not heretofore been possible to develop hydrophobic surfaces or layers with an unlimited service life while maintaining contact angles of more than 90 degrees. The same also applies to completely erosion-resistant surfaces and layers for components of power plants, such as turbines and condensers.

SUMMARY OF THE INVENTION

It is accordingly an object of the invention to provide a protective coating for metallic components that overcomes the disadvantages and drawbacks of the prior art protective coatings of this general type, and that not only has a strong hydrophobic surface but moreover offers a high resistance to drop impact erosion.

With the foregoing and other objects in view, there is provided, in accordance with the invention, a protective coating for metallic components which are in direct contact with the condensate of a liquid medium, comprising at least two and preferably more layers of amorphous material for application to such component on top of one another.

There also is provided, in accordance with the invention, a metallic component suitable for direct contact with the condensate of a liquid medium, that is coated with the protective coating according to the invention.

There is furthermore provided, in accordance with the invention, a method of coating a metallic component suitable for direct contact with the condensate of a liquid medium, with the protective coating according to the invention.

It has been found, in accordance with the invention, that the resistance to drop impact erosion of homogenous surfaces increases as the hardness of the material from which they are made increases. The harder a surface, the more energy has to be applied to deform the surface or remove parts from it. The resistance to drop impact erosion therefore increases with the interfacial energy. Metallic or purely ceramic surfaces with an interfacial energy of a few thousand $mJ/m^2$ are more resistant to drop impact erosion than relatively soft layers, the interfacial energies of which are only a few tens of $mJ/m^2$.

In the case of water as the fluid, on a hard surface the interfacial tension of this surface is therefore high compared to the surface tension of the water. This means that on the one hand, an erosion-resistant, homogenous, hard surface forms smaller wetting angles with water as it becomes more stable with respect to drop impact erosion. On the other hand, low-energy surfaces, which preferably have hydrophobic properties, do not have a great resistance to drop impact erosion.

In view of these facts, the protective coating according to the invention must have an inhomogeneous structure which comprises at least two layers that have different properties, in order to be able to satisfy the demands with regard to both lack of wettability and erosion stability. The layers of the protective coating are all made from amorphous materials. It is quite possible for all the layers to be made from the same material. The layers may also be made from a different material which has the same properties. According to the invention, the protective coating has two types of layers, specifically a first type of layer with a high interfacial energy and a hardness of between 1500 HV and 3000 HV, and highly elastic deformation properties, so that it has a high erosion stability; and a second type of layer with an interfacial energy and elastic deformation properties that are lower than those of the first layer described. Its hardness is only 500 HV to less than 1500 HV. The number of layers of which the protective coating is composed is not limited to two layers, however.

In order to form the protective coating, first of all, if possible, a layer which has a high interfacial energy, highly elastic deformation properties and a hardness of between 1500 HV and 3000 HV is applied to the surface of a component which is to be protected. The thickness of this layer should be 1 μm to 4 μm. A second layer with a lower interfacial energy and lower elastic deformation properties, with a hardness of only 500 HV to less than 1500 HV, is applied to this first layer. The second layer should be less than 1 μm to 2 μm thick. According to the invention, the protective coating is always formed in such a way that the outwardly facing, final layer of the structure has hydrophobic properties and therefore has a lower interfacial energy and lower deformation properties, as well as a lower hardness, than the layer below it. It is quite possible for the structure of the protective coating to be expanded further, if necessary, and for an additional layer with high elastic deformation properties also to be applied to the latter layer and then finally for a layer with hydrophobic properties to be applied on the outer side.

The bonding strength of the protective coating on the component has to be very high, so that it cannot be detached over the course of time by the actions of external forces. The same also applies to the adhesion forces of the layers to one another. If the adhesion forces between a component and what is normally the first, inner, erosion-resistant layer of the protective coating are too low, so that there is a likelihood that the protective coating will rapidly become detached, the first, inner layer of the protective coating can also be formed by a layer with a lower interfacial energy and lower elastic deformation properties. Then, a layer with a high interfacial energy, highly elastic deformation properties and a hardness of between 1500 HV and 3000 HV is applied to the first layer just described. A hydrophobic layer in turn finishes the protective coating. According to the invention, any layer structure can be expanded as desired, should circumstances demand. For example, a hydrophobic layer of lower interfacial energy and lower elastic deformation properties can again be applied to a layer with a high interfacial energy and highly elastic deformation properties. In any case, it should be ensured that such a hydrophobic layer always forms the boundary of the protective coating according to the invention toward the outside.

The protective coating according to the invention may also be formed in such a way that first of all a layer with a high interfacial energy is applied to a component which is to be protected. This layer is followed on the outer side by a layer with a lower interfacial energy. Building up of the protective coating is continued in this alternating form, ending with a layer with a lower interfacial energy. In this case, however, the protective coating is built up in such a way that transitions between the layers are smooth, such that gradient layers are formed, without any discrete interfaces. Building up a protective coating of this type has the advantage that the mechanical couplings between the layers are reinforced further.

It is possible to increase the erosion resistance of a coated component by 60% as compared to a comparable component made from titanium without a protective coating by using one of the protective coatings described above, the layers of which are all made from amorphous carbon or other hard, elastic materials of suitable interfacial energies, For this comparison, the surfaces of a coated component and an uncoated component were exposed to the actions of a liquid. The drops of the liquid struck the surfaces of the components at a velocity of at least 200 m/s. The erosion resistances of the two components were compared after more than $5*10^7$ drop impacts.

Since the protective coating is always bounded on the outer side by a hydrophobic layer, the formation of a film of condensate on the surface of the protective coating is completely prevented. A film of this type is able to partially or completely absorb the kinetic energy of the drops which strike it just through the use of the boundary layer of the protective coating. The energy of the drops is introduced into the protective coating, where considerable damping of the mechanical deformation is caused by multiple reflections between alternately elastic and plastic deformation properties which differ in different regions. The close mechanical coupling of the outer layer of the protective coating to the layer directly below it with a high interfacial energy and high elasticity ensures that the outer layer of the protective coating has a longer service life, even with continuously impinging drops at the velocity described above, than if the component is coated only with a hydrophobic layer.

Other features which are considered as characteristic for the invention are set forth in the appended claims.

Although the invention is illustrated and described herein as embodied in a protective coating for metallic components, metallic components coated with such a protective coating, and a method of coating metallic components with such a protective coating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
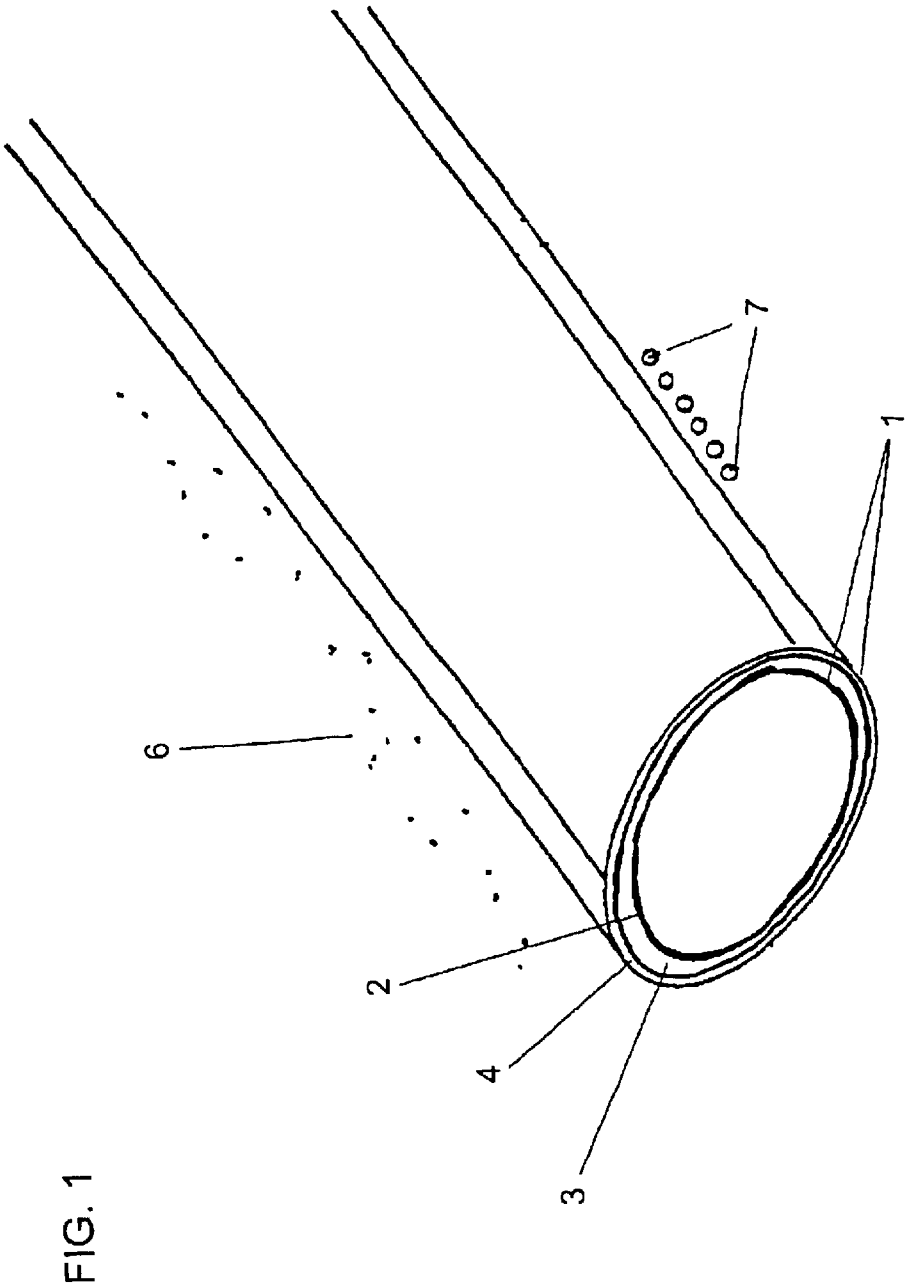
FIG. 1 is a fragmentary diagrammatic, perspective view of a protective coating on a component.

Referring now to the figures of the drawings in detail and first, particularly, to FIG. 1 thereof, there is seen a protective coating 1 which has been applied to a tube 2. The tube 2 is made of titanium and forms part of a condenser which is a component of a non-illustrated steam power plant. In the exemplary embodiment illustrated herein, the protective coating 1 is formed by two layers 3 and 4, the first layer 3 having erosion-resistant properties and the second layer 4 having hydrophobic properties. The layer 3 has an interfacial energy of 30 to 2500 mJ/m$^2$. Furthermore, it has highly elastic deformation properties. The ratio of elastic to plastic mechanical deformation in this layer is at least 6 to 10 in a standard hardness test. Moreover, the layer 3 has a hardness of 1500 to 3000 HV. In the exemplary embodiment illustrated herein, its thickness is 3 μm. The layer 4 has an interfacial energy which is significantly lower than the interfacial energy of the layer 3. It is at most about 20 mJ/m$^2$. The same applies to the elastic deformation properties and the hardness, which is only 500 HV to less than 1500 HV. The layer 4 is 1 μm thick. In the exemplary embodiment illustrated herein, both layers 3 and 4 are made of amorphous carbon. Of course, it is also possible for another amorphous material or a material which does not belong to the group of the amorphous materials to be used to form the layers 3 and 4. However, all materials which come under consideration must have identical properties in terms of hardness, interfacial energy and elastic deformation. An additive of silicon and/or fluorine is admixed with the amorphous material in a known way to ensure that the layer 4 maintains its hydrophobic properties. As shown in FIG. 1, first of all an erosion-resistant layer 3 is applied to the surface of the tube 2. The hydrophobic layer 4 has been applied directly to the layer 3. The result of this is that a working medium 6 in steam form, which condenses on the surface of the component 2 or has already condensed elsewhere and strikes the surface of the layer 4 in the form of drops 7, cannot form a continuous film of condensate. Rather, the drops 7 only adhere for a short time. Should conditions require, it is possible for a further layer sequence, comprising a layer 3 and a layer 4, to be applied to the layer 4. It is unimportant how many layers are ultimately applied alternately one above the other to the surface of the component 2. Only the following points need to be borne in mind. It must be ensured that the final layer, which delimits the protective coating 1 on the outer side, is always a hydrophobic layer 3. Furthermore, it should be ensured that the thermal resistance of the layer sequence is not too high and that the mechanical stability of the overall structure of the coating is not adversely affected.

Figure 2:
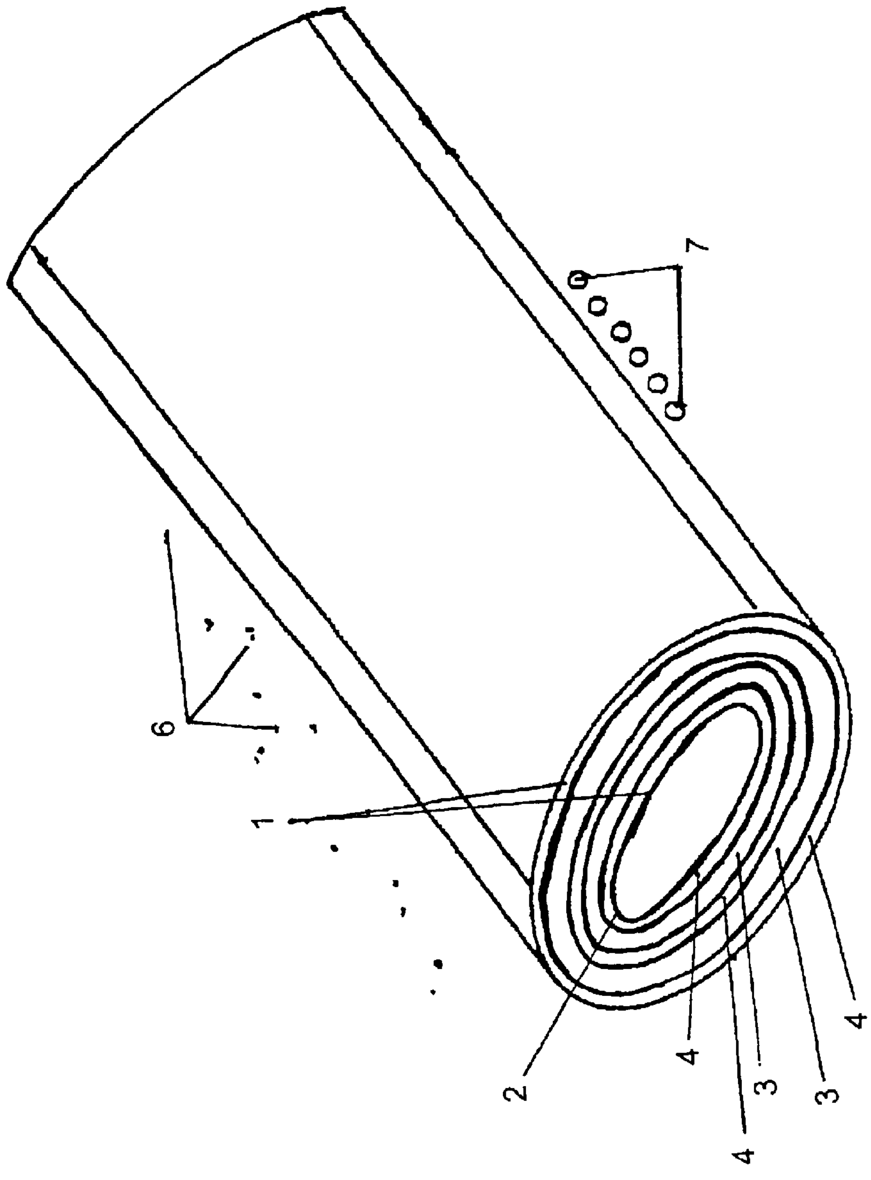
FIG. 2 is a view similar to FIG. 1 of a variant of the protective coating shown therein.

FIG. 2 shows a variant of the protective coating 1. This is used when the adhesion forces between a component 2, which in this case is likewise constructed as a tube, and the erosion-resistant layer 3 being used are not sufficiently high, and consequently it has to be assumed that the protective coating 1 could very quickly become detached from the surface of the component 2. In this case, first of all a hydrophobic layer 4 with the properties explained in the description of FIG. 1 is applied in a thickness of 1 μm to the component 2. This is then followed by a layer 3 having the properties explained in the description of FIG. 1. This layer is applied with a thickness of 1 μm to 3 μm. This alternating sequence of layers 3, 4 can be continued as desired. However, in this case too the same conditions as those which have been explained in connection with the description of FIG. 1 need to be observed. In this case too, however, a hydrophobic layer 4 must delimit the protective coating 1 on the outer side.

When forming the protective coatings 1 shown in FIG. 1 and 2 and explained in the associated descriptions, it is possible to form smooth transitions between the properties of the layers 3 and 4 instead of discrete interfaces between the layers. This can be achieved by suitable, gradual adjustments of the coating parameters, for example by suitable adjustment of the bias voltage if the coating is produced by gas discharge.

We claim:

1. A protective coating for a metallic component in direct contact with the condensate of a liquid medium, comprising at least two layers of amorphous material on top of one another, the outermost one of the two layers of amorphous material being a hydrophobic layer and the innermost one of the two layers of amorphous material being an erosion-resistant layer, wherein the innermost layer has a high interfacial energy, highly elastic deformation properties and a hardness of between 1,500 HV and 3,000 HV, the outermost layer has an interfacial energy and deformation properties lower than those of an erosion-resistant layer, and each hydrophobic layer has a hardness of between 500 HV and less than 1500 HV.

2. The protective coating according to claim 1, wherein said at least two layers includes two layers of amorphous material and, with respect to said two layers of amorphous material, one of said layers is an erosion-resistant layer and the other of said layers is a hydrophobic layer.

3. The protective coating according to claim 2, wherein the thickness of said erosion-resistant layer is in the range of 1–3 micrometers.

4. The protective coating according to claim 2, wherein the thickness of said hydrophobic layer is 1 micrometer.

5. The protective coating according to claim 2, further comprising a smooth transition between erosion-resistant layer and said hydrophobic layer.

6. The protective coating according to claim 2, wherein said amorphous material of said erosion-resistant layer is amorphous carbon and said amorphous material of said hydrophobic layer is amorphous carbon.

7. The protective coating according to claim 6, wherein the interfacial energy of said erosion-resistant layer is in the range of 30 to 2500 $mJ/m^2$.

8. The protective coating according to claim 6, wherein the interfacial energy of said hydrophobic layer is about 20 $mJ/m^2$.

9. A metallic component in direct contact with the condensate of a liquid medium, comprising:

a metallic body; and a protective coating on the metallic body, the protective coating having at least two layers of amorphous material on top of one another, the outermost one of the two layers of amorphous material being a hydrophobic layer and the innermost one of the two layers of amorphous material being an erosion-resistant layer, wherein the innermost layer has a high interfacial energy, highly elastic deformation properties and a hardness of between 1,500 HV and 3,000 HV, the outermost layer has an interfacial energy and deformation properties lower than those of an erosion-resistant layer, and each hydrophobic layer has a hardness of between 500 HV and less than 1500 HV.

10. The metallic component according to claim 9, further comprising an alternation of at least one erosion-resistant layer and at least one hydrophobic layer, the boundary layer facing outward being a hydrophobic layer.

11. The metallic component according to claim 9, wherein the coating layer closest to the component is an erosion-resistant layer.

* * * * *